US011392699B2

United States Patent
Rubin

(10) Patent No.: US 11,392,699 B2
(45) Date of Patent: Jul. 19, 2022

(54) DEVICE, METHOD, AND SYSTEM FOR SYNTHESIZING VARIANTS OF SEMANTICALLY EQUIVALENT COMPUTER SOURCE CODE USING COMPUTER SOURCE CODE COMPONENTS TO PROTECT AGAINST CYBERATTACKS

(71) Applicant: SPAWAR Systems Center Pacific, San Diego, CA (US)

(72) Inventor: Stuart H. Rubin, San Diego, CA (US)

(73) Assignee: United States of America as Represented by Secretary of the Navy, Washington, DC (US)

(*) Notice: Subject to any disclaimer, the term of this patent is extended or adjusted under 35 U.S.C. 154(b) by 532 days.

(21) Appl. No.: 16/359,821

(22) Filed: Mar. 20, 2019

(65) Prior Publication Data
US 2020/0302059 A1 Sep. 24, 2020

(51) Int. Cl.
*G06F 21/57* (2013.01)
*G06F 8/70* (2018.01)
*G06F 8/36* (2018.01)

(52) U.S. Cl.
CPC ............... *G06F 21/57* (2013.01); *G06F 8/36* (2013.01); *G06F 8/70* (2013.01); *G06F 2221/033* (2013.01)

(58) Field of Classification Search
CPC ... G06F 21/57; G06F 8/36; G06F 8/70; G06F 2221/033
USPC ..................................................... 726/22–26
See application file for complete search history.

(56) References Cited

U.S. PATENT DOCUMENTS

| 7,047,228 B1 | 5/2006 | Rubin |
| 7,100,205 B2* | 8/2006 | McDermott ........ G06F 12/1408 711/E12.092 |
| 7,757,284 B1* | 7/2010 | Viljoen ................... G06F 21/57 726/22 |
| 7,870,394 B2* | 1/2011 | Repasi .................. G06F 21/562 713/188 |

(Continued)

OTHER PUBLICATIONS

Khan et al, "A Rigorous and Efficient Run-time Security Monitor for Real-time Critical Embedded System Applications", IEEE, pp. 100-105 (Year: 2016).*

(Continued)

*Primary Examiner* — Anil Khatri
(74) *Attorney, Agent, or Firm* — Naval Information Warfare Center, Pacific; Kyle Eppele; Evan Hastings

(57) ABSTRACT

A device, method, and system for synthesizing variants of semantically equivalent computer source code using computer source code components to protect against cyberattacks. An input constraint, an output constraint, and a schema are received from a user. A component-based synthesizer generates first computer source code including a first computer source code component based on the input constraint, the output constraint, and the schema. The component-based synthesizer generates second computer source code including a second computer source code component based on the input constraint, the output constraint, and the schema. The second computer source code is generated as a semantically equivalent variant of the first computer source code to provide for protection against a cyberattack. The invention may also include a dynamic component library.

14 Claims, 4 Drawing Sheets

(56) References Cited

U.S. PATENT DOCUMENTS

| | | | |
|---|---|---|---|
| 7,925,496 B1 | 4/2011 | Rubin | |
| 8,135,994 B2 * | 3/2012 | Keromytis | G06F 11/3688 714/38.11 |
| 8,239,836 B1 * | 8/2012 | Franz | G06F 21/52 717/127 |
| 8,280,831 B1 | 10/2012 | Rubin | |
| 8,359,343 B2 * | 1/2013 | McConnell | G06F 16/29 707/899 |
| 8,489,648 B1 | 7/2013 | Rubin | |
| 8,578,483 B2 * | 11/2013 | Seshadri | G06F 21/57 726/22 |
| 8,763,127 B2 * | 6/2014 | Yao | G06F 21/566 726/24 |
| 8,918,865 B2 * | 12/2014 | Freericks | H04L 63/0428 726/22 |
| 8,973,138 B2 * | 3/2015 | Byrkit | G06F 21/567 726/23 |
| 9,009,819 B1 * | 4/2015 | Savant | G06F 21/554 726/22 |
| 9,317,679 B1 * | 4/2016 | Bhatkar | G06F 21/562 |
| 9,349,014 B1 * | 5/2016 | Hubing | G06F 21/577 |
| 9,418,222 B1 * | 8/2016 | Rivera | G06F 21/577 |
| 9,436,912 B1 | 9/2016 | Rubin | |
| 9,449,280 B2 | 9/2016 | Rubin | |
| 10,346,395 B2 * | 7/2019 | Rubin | G06F 21/52 |
| 10,366,213 B2 * | 7/2019 | Hay | G06F 21/12 |
| 10,375,106 B1 * | 8/2019 | Roesler | H04L 63/1433 |
| 11,106,801 B1 * | 8/2021 | Levine | G06F 9/451 |
| 2017/0039374 A1 | 2/2017 | Rubin | |

OTHER PUBLICATIONS

Brim et al, "Component-Interaction Automata as a Verification Oriented Component Based", ACM, pp. 1-8 (Year: 2005).*

Topanta et al, "An Approach of Cyberattacks with the Use of Social Networks and Communication Media for Public Organizations of the Ecuador", ACM, pp. 67-72 (Year: 2019).*

Perera et a, Cyberattack Prediction Through Public Text Analysis and Mini-Theories:, IEEE, pp. 3001-3010 (Year: 2018).*

Nan et al, "HISyn: Human Learning-Inspired Natural Language Programming", ACM, pp. 75-86 (Year: 2020).*

Yaghmazadeh et al., "SQLizer: Query Synthesis from Natural Language", ACM, pp. 1-26 (Year: 2017).*

Phal et al, "ISQNL: Interpretable SQL Query Synthesizer from Natural Language Input", ACM, pp. 1-6 (Year: 2019).*

Nasiri et al, "Detection and Identification of Cyber-Attacks in Cyber-Physical Systems Based on Machine Learning Methods", IEEE, pp. 107-112 (Year: 2020).*

Rubin, S.H., "On Randomization and Discovery", Information Sciences, vol. 177, pp. 170-191, Jan. 2007.

Chaitin, G.J ., Randomness and Mathematical Proof, Sci. Amer., vol. 232, No. 5, pp. 47-52, 1975.

S. H. Rubin, Unpublished U.S. Appl. No. 15/652,074, Solving NP-Hard Problems through Heuristic Acquisition and Reuse, filed Jul. 17, 2017.

Eccles, Understanding of the Brain, New York, NY: McGraw-Hill Co., 2d ed., 1976.

V.A. Uspenskii, Gödel's Incompleteness Theorem, Translated from Russian. Moscow: Ves Mir Publishers, 1987.

A. Gherbi, R. Charpentier, and M. Couture, "Software Diversity for Future Systems Security," CrossTalk, pp. 10-13, Sep./Oct. 2011.

Rubin, "Computing with Words," IEEE Trans. Syst., Man. and Cybern.: Part B, 29 (4), pp. 518-524, 1999.

S. Forrest, A. Somayaji, and D.H. Ackley, "Building Diverse Computer Systems," IEEE Computer Society Press.

Franz, Software Defenses (Using Compiler Techniques), Department of Computer Sciences, University of California, Irvine, power point presentation at SSC-PAC, May 12, 2014.

Rubin et al., "Cyber-Secure UAV Communications using Heuristically Inferred Stochastic Grammars and Hard Real-Time Adaptive Waveform Synthesis and Evolution", IEEE International Conference on Information Reuse and Integration (IRI), Aug. 2017.

Mayo et al., "The Theory of Diversity and Redundancy in Information System Security: LDRD Final Report". Sandia National Laboratories, Oct. 2010.

Rubin et al., "KASER: Knowledge Amplification by Structured Expert Randomization", IEEE Transactions on Systems, Man, and Cybernetics—Part B: Cybernetics, vol. 34, No. 6, Dec. 2004.

S. H. Rubin, Unpublished U.S. Appl. No. 16/053,258, Device, Method, and System for Synthesizing Variants of Semantically Equivalent Computer Source Code to Protect Against Cyber-Attacks, filed Aug. 2, 2018.

Rubin et al., "Reusing the NP-Hard Traveling-Salesman Problem to Demonstrate that P~NP," Proc. 2016 IEEE International Conference on Information Reuse and Integration (IRI). Pittsburgh, PA, pp. 574-581, Jul. 2016.

Kfoury et al., A Programming Approach to Computability, New York, NY: Springer-Verlag Inc., 1982.

Ammann et al., Computer Security, Dependability, and Assurance: from Needs to Solutions: Proceedings Jul. 7-9, 1998, York, England, Nov. 11-13, 1998, Williamsburg, VA, IEEE Computer Society Press.

Cousins, Nobel Prize Conversations: With Sir John Eccles, Roger Sperry, Ilya Prigogine, Brian Josephson, San Francisco, CA: Saybrook Publishers, 1985.

Rubin et al., "On the tractable acquisition of heuristics for software synthesis demonstrating that P~NP," Quality Software through Reuse and Integration, Advances in Intelligent Systems and Computing, Springer International Publishing, Switzerland (AISC 561, Ch. DOI: 10,1007/978-3-319 56157-8_1), Ch. 1, pp. 1-23, Jan. 2018.

S. H. Rubin, Unpublished U.S. Appl. No. 16/197,019, Method, Device, and System for using Variants of Semantically Equivalent Computer Source Code to Protect Against Cyberattacks, filed Nov. 20, 2018.

Fleener et al., "Correct-schema-guided synthesis of steadfast programs," Proceedings 12th IEEE International Conference Automated Software Engineering, Nov. 1997.

Denney et al., "Combining Model-driven and Schema-based Program Synthesis," Conference: Proceedings of the International Conference on Software Engineering Research and Practice, Jun. 2004.

S. H. Rubin, Unpublished U.S. Appl. No. 15/214,763, Randomization via Dynamic Representation and Informed Search for Novel Naval Wartime Strategies, filed Jul. 20, 2016.

* cited by examiner

| Q1 | Q2 | Q3... | QN | Schema/Component Set Name | I/O Vectors | Component |
|---|---|---|---|---|---|---|
| a | - | - | - | - | - | - |
| - | b | - | - | Compute xyz Using c | I/O Vector 1<br>I/O Vector 2<br>...<br>I/O Vector i | $C_1$<br>$C_2$ ... $C_i$ |
| - | - | c | a | - | - | - |
| - | - | - | - | - | - | - |

DEVICE, METHOD, AND SYSTEM FOR SYNTHESIZING VARIANTS OF SEMANTICALLY EQUIVALENT COMPUTER SOURCE CODE USING COMPUTER SOURCE CODE COMPONENTS TO PROTECT AGAINST CYBERATTACKS

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc pac t2@navy.mil, referencing NC 103758.

FIELD OF THE INVENTION

The present disclosure pertains generally to cybersecurity. More particularly, the present disclosure pertains to protecting against cyberattacks using computer-generated variants of semantically equivalent computer source codes.

BACKGROUND OF THE INVENTION

The number of computational devices using embedded software is rapidly increasing. Also, the functional capabilities of embedded software are becoming increasingly complex each year.

With the increase in complexity of software systems comes a problem of cybersecurity. For complex interactions across software computer source code components and subsystems, a great number of lines of source code is needed. Such source code is not only prone to errors but is increasingly becoming the target of cyberattacks. It is not generally possible to produce fault-free source code, and attackers have shown the ability to find and exploit residual faults and use them to formulate cyberattacks.

It is not unusual to find different software systems using substantially similar software. As a result, successful cyberattacks can impact a large number of different installations running similar software.

Conventionally, cyberattacks are detected by detecting viral signatures, which indicate that a cyberattack has occurred. However, this approach is not sufficiently effective, especially as software becomes highly distributed across many processors.

More-recent approaches attempt to detect a cyberattack before any recoverable damage occurs. One such approach involves the use of syntactic diversification. This approach uses distinct compilers to create distinct object codes from the same source code. While this approach is somewhat effective, it will only succeed against at most one version of object code. However, as cyberattacks grow in their sophistication, they can succeed against multiple versions of object code simultaneously.

In view of the above, it would be desirable to address shortcomings of conventional approaches for providing protection of computer systems against cyberattacks.

SUMMARY OF THE INVENTION

According to illustrative embodiments, an input constraint, an output constraint, and a schema are received from a user. A component-based synthesizer generates first computer source code including at least a first computer source code component based on the input constraint, the output constraint, and the schema. The component-based synthesizer generates second computer source code including at least a second computer source code component based on the input constraint, the output constraint, and the schema. The second computer source code is generated as a semantically equivalent variant of the first computer source code to provide for protection against a cyberattack.

These, as well as other objects, features and benefits will now become clear from a review of the following detailed description, the illustrative embodiments, and the accompanying drawings.

BRIEF DESCRIPTION OF THE DRAWINGS

Features of illustrative embodiments will be best understood from the accompanying drawings, taken in conjunction with the accompanying description, in which similarly-referenced characters refer to similarly-referenced parts, and in which:

FIG. 2 depicts an example of a structure of a dynamic component library according to an illustrative embodiment.

DETAILED DESCRIPTION OF THE EMBODIMENTS

According to illustrative embodiments, variants of semantically equivalent computer source code are used for cybersecurity. Distinct but equivalent computer source codes are synthesized to provide for protection against a cyberattack.

Variants of computer source code may be synthesized using a component-based approach, which enables automatic programming through the use of input constraints and output constraints. Given the same input to diverse computer source code components, whose behavior on this input is known, the same output is expected. If the same output is not produced after compilation and execution, then a cyberattack may be in progress. This process is amenable to parallel processing in a component-based synthesizer. This is far easier than having coders write a diverse set of complex algorithms.

Figure 1:
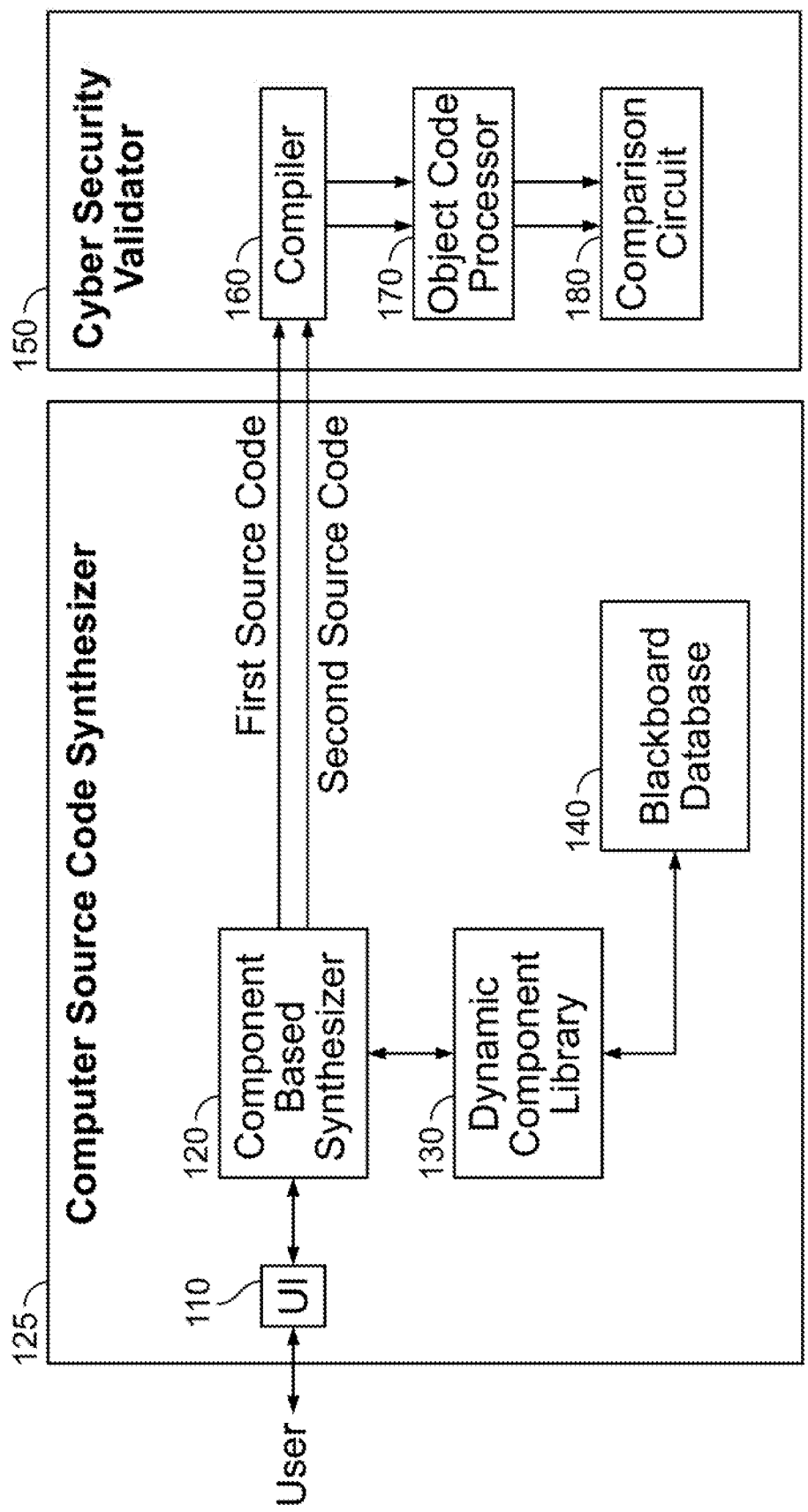
FIG. 1 illustrates an example of a cyber-secure automatic programming system according to an illustrative embodiment.

FIG. 1 illustrates an example of a cyber-secure automatic programming system according to an illustrative embodiment. As shown in FIG. 1, the cyber-secure automatic programming system 100 includes a computer source code synthesizer 125 and a cybersecurity validator 150. The computer source code synthesizer 125 is in wired or wireless communication with the cybersecurity validator 150. The cybersecurity validator 150 may be included as part of the cyber-secure automatic programming system 100 as depicted in FIG. 1 or may exist as a separate system.

The computer source code synthesizer 125 synthesizes computer source code based on one or more user-specified input constraints, output constraints, and schema received via a user interface (UI) 110. The input constraints, output constraints, and schema may be specified as a natural language statement.

The input constraints, output constraints, and/or the schema may be received responsive to one or more computer-generated questions issued by, for example, the component-based synthesizer 120 as described in more detail below. The user interface 110 may be implemented with any suitable user interface, such as a microphone, a keypad, a touchscreen, etc.

The computer source code synthesizer 125 includes a component-based synthesizer 120 that includes at least one processor. The component-based synthesizer 120 is configured to generate different but semantically equivalent computer source codes based on an input constraint, an output constraint, and a schema received from a user via the user interface 110. For example, the component-based synthesizer 120 generates first computer source code and second computer source code based on the input constraint, the output constraint, and the schema. The second computer source code is a semantically equivalent variant of the first computer source code.

While a cyberattack may succeed against one of the generated computer source codes, it is highly unlikely that an attack will succeed against multiple variants of the computer source code. Thus, generating semantically equivalent variants of computer source code provides for protection against cyberattacks.

According to one embodiment, synthesized semantically equivalent variants of computer source code are intended to produce the same desired result when compiled and executed. Any difference between the results is an indication that a cyberattack has occurred or is occurring. This is described in further detail below.

According to illustrative embodiments, the schema received from a user is associated with a set of the computer source code components stored in a dynamic component library 130. The dynamic component library 130 is configured to store a plurality of computer source code components in association with schema and input/output (I/O test vectors. The stored computer source code components may be populated ahead of time and may be updated as appropriate.

The component-based synthesizer 120 selects computer source code components having associated schema from the dynamic component library 130 based on the input constraint, the output constraint, and the schema received from the user. In particular, the component-based synthesizer 120 selects a set of computer source code components that is associated with the schema from the dynamic component library 130 and selects a computer source code component from among the selected set of computer source code components that satisfies the input constraint and the output constraints. If there are multiple computer source code components among the selected set of computer source code components that satisfy the input constraint and the output constraint, the computer source code component may be selected from among the multiple computer source code components randomly (by chance). That is, the component-based synthesizer 120 selects the computer source code component, at random, from among the multiple computer source code components without favoring one computer source code component over another.

For example, the component-based synthesizer 120 selects, as a first computer source code component, one computer source code component from among a selected set of computer source code components that satisfies the input constraint and the output constraint. If there are multiple computer source code components among the selected set of computer source code components that satisfy the input constraint and the output constraint, the component-based synthesizer 120 selects the one computer source code component from among the multiple computer source code components randomly (by chance).

Similarly, the component-based synthesizer 120 selects, as a second source code component, one computer source code component from among the selected set of computer source code components that satisfies the input constraint and the output constraint. If there are multiple computer source code components among the selected set of computer source code components that satisfy the input constraint and the output constraint, the component-based synthesizer 120 selects the one computer source code component from among the multiple computer source code components by chance.

Computer source code components may be defined in terms of other computer source code components and may be constrained by schemas. Schemas contain the same framework as computer source code components with one important difference. Schemas include one or more articulation points, including alternative computer source code components, to be randomly selected among in order to complete the definition of an executable computer source code component. Every schema embodies the definition for multiple computer source code components. Each schema defines sets of alternative "left-hand-side" conditional computer source code components and sequences of alternative "right-hand-side" action computer source code components.

As noted above, input constraints, output constraints, and schema may be specified as a natural language statement. Thus, computer source code components may be specified and retrieved from the dynamic component library 130 using natural language statements. This serves to make schemata much easier to write and read as their functionality is explicit.

Natural language statements are understood by the component-based synthesizer 120 by presenting the user with True/False questions and/or multiple-choice questions via the user interface 110. These questions and answers may be dynamically created by a user, on an as needed basis, for the disambiguation and lookup of specified computer source code components. Users may provide abbreviated or extended responses. For extended responses, the component-based synthesizer 120 will echo the best match. Users may also specify, "that one", "next", "backup one", "repeat that", "none of them", "the third one", etc. for diverse specifications.

The dynamic component library 130 logically stores/moves acquired/referenced computer source code components at/to the head and expunges the least-recently-used ones off the logical tail (i.e., tail deletion). According to illustrative embodiments, domain-specific functions define computer source code components written in one or more third-generation languages (e.g., Lisp), including calls to other computer source code components. If the domain is highly symmetric, then computer source code components can often make use of this symmetry to automatically complete the computer source code component specification. These computer source code components serve as the foundation for scalable, efficient, automatic programming and also serve the on-going need to supply new, or random, components to cover ever-more diverse codes.

The dynamic component library 130 may be structured as shown in FIG. 2. Questions posed to users and their associated unique answer numbers are stored first. As shown in FIG. 2, these questions may include multiple choice questions Q1, Q2, Q3 . . . QN with answers "a", "b", "c", etc. Although not shown, these questions may also include True/False questions with answers "True" and "False". The questions and answers are used to uniquely identify the natural language statement(s) specifying a schema associated with a set of computer source code components. The questions and answers refer to a "lookup table".

Next, schemata identified by question-answer pairings are stored. As shown in FIG. 2, an example of a schema identified by a multiple choice answer "b" to a question "Q2" may be "Compute XYZ using C". This schema means that "XYZ" should be computed using a computer source code component from a computer source code component set "C". Although not shown, a "More" option may be included in the dynamic component library 130 to allow for the inclusion of a paragraph of supplemental notes.

Input/Output (I/O) vectors are stored next. Each I/O vector is stored in association with a computer source code component. I/O vectors and computer source code components that have common semantics are stored as a set which is ascribed a name. In FIG. 2, "I/O vector 1, I/O vector 2, . . . I/O vector i" are stored in association with computer source code components "C1, C2, C3," respectively, as a set "C" that is associated with the schema "Compute XYZ using C".

As noted above, the component-based synthesizer 120 selects computer source code components from the dynamic component library 130 based on the received schema, input constraint, and output constraint. That is, the component-based synthesizer 120 selects a set of computer source code components that are associated with the schema and then selects a computer source code component from the selected set that satisfies the input constraint and the output constraint. The component-based synthesizer 120 determines whether a computer source code component satisfies the input constraint and the associated output constraint by executing the I/O test vectors associated with the computer source code component(s). Schemata may be randomly instantiated to yield multiple candidate components for testing against the I/O vectors, alone or in composition.

Thus, for example, consider a schema specifying "Compute using addition with F" an input and output constraints indicating that for an input of 1, an output should be 3. Then, assume that the component-based synthesizer 120 selects a computer source code component $F_1$ from the set of F computer source code components associated with the schema that defines a function "add 1 to an input to produce output". The component-based synthesizer 120 would execute the I/O test vector associated with the computer source code component $F_1$ and determine that the computer source code component $F_1$ does not satisfy the input constraint and the output constraint. The component based-synthesizer 120 may then select another computer source code component $F_2$ from the set of F computer source code components associate with the schema. Consider that the computer source code component $F_2$ defines a function to "add 2 to an input". The component-based synthesizer 120 would execute the I/O test vector associated with the computer source code component $F_2$ and determine that the computer source code component $F_2$ does satisfy the input and output constraints. Accordingly, the computer source code component $F_2$ would be selected for synthesis as computer source code.

According to illustrative embodiments, the component-based synthesizer 130 may select computer source code components from a set of computer source code components that have common semantics by chance. Additionally, computer source code components that have alternative semantics but are still associated with the schema may be presented to the user by the component-based synthesizer 120 in a relatively short list, and the user may select a computer source code component from the list.

In the same way that computer source code components are selected from the dynamic component library 130, sequences or compositions of computer source code components may be selected based on the schema and input and output constraints. The order of the computer source code components may be selected at random (by chance) and verified using the input and output constraints.

For example, consider a schema that specifies computer source code components F and G, where F doubles an input and G adds 1 to an input. Consider input and output constraints specifying that for an input of 1, the output should be 3. The sequence of computer source code components FG would result in an output of $(1+1) \times 2 = 4$. The sequence of computer source code components GF would result in an output of $(1 \times 2) + 1 = 3$. The sequence of computer source code components FG would not satisfy the input and output constraints, but the sequence of computer source code components GF would satisfy the input and output constraints.

The component-based synthesizer 130 may select the sequence of computer source code components FG by chance but would determine, upon executing the associated I/O test vectors associated with each of the computer source code components, that the sequence FG does not satisfy the input and output constraints. Then, the component-based synthesizer 130 would select the GF sequence of computer source code components, by chance in more or less due course, and determine that the order GF satisfies the input and output constraints. Accordingly, the component-based synthesizer 120 would select the sequence GF to use for generating computer source code. Undiscovered component compositions may result in a call to the user or a knowledge engineer to supply a random component, or at least to allow for increased symmetric search time, the particulars of which may vary with the implementation.

Interaction between computer source code components in a composition or sequence of computer source code components may occur using a blackboard database 140. The blackboard database 140 may include an internal blackboard database and an outer blackboard database. The inner blackboard may be considered internal to a computer source code component. The inner blackboard may be dynamically modified by the computer source code component and transferred to a calling computer source code component's outer blackboard, if any, upon exit. The internal blackboard may then be expunged.

Fired computer source code components can post question-response pairings to the blackboard database 140 and/or trigger other application-specific questions in addition to issuing statements and/or effective actions. A set of question-response pairings may (e.g., for algorithmic processing) or may not (e.g., for natural language processing) have an associated computer source code component.

If the natural language statement used to specify a schema is an exact match for a computer source code component in the dynamic component library 130, then no questions are asked, and the computer source code component name is substituted for the natural language. Otherwise, questions for the user are extracted from the computer source code component rows in the dynamic component library 130. A random question is presented from the first row (maintained using the 3-2-1 move-to-the-head skew described below) in the context of all of the question-response pairings obtained to that point. The process continues, moving away from the list head, until all of the resulting computer source code components, which comprise a non-deterministic list, having the same semantics (the degenerate case is a single computer source code component), are found. The (non-deterministic) list of computer source code component names is substituted for the natural language specification prior to compilation.

If a question-answer session results in no satisfying computer source code components, the results of the question-response session are sufficient to uniquely characterize the new computer source code component, which needs to be written, ascribed natural language semantics, and inserted at the head of the computer source code component library and associated lookup table.

If the question-answer session results more than one disjoint group of (non-deterministic) computer source code components, then additional questions and answers are needed to winnow down the results (implying selection among disjoint alternates). Here, the user specifies the question(s)-response(s) to select among the disjoint (non-deterministic) computer source code components, or to reference a new computer source code component, as appropriate.

These operations result in the referenced computer source code component being logically moved to the head of the library and the lookup table. Again, optional tail deletion keeps the size of the dynamic component library 130 in check.

Questions and their associated responses may be augmented by semantically equivalent natural language statements. Alternate forms may be selected among by chance. Selected answers are moved to the head so that any future order of presentation will reflect a most-likely scenario. Questions and their associated responses may be expunged when no longer referenced. New questions and their alternates may be checked to be sure that they are literally distinct.

For the sake of efficiency, optimization may be performed by manually updating computer source code component definitions. The updated definitions will then be automatically reused in all invocations of the modified computer source code components. Thus, modifying a computer source code component will necessarily affect all invoking computer source code components as well.

The computer source code components, I/O test vectors, and the schema associated with sets of the computer source code components in the dynamic component library 130 may be segmented from the question-answer pairings for efficiency. This means that the entries may be distributed and maintained across Single Instruction Multiple Data (SIMD) parallel processors. The greater the availability of parallel processors, the less time that will be required for execution.

If an excessive search for a computer source code component associated with any schema is required (for the number of utilized processors), intractability may result. Thus, a flag may be raised whenever a defining algorithm cannot be synthesized in the allotted time. I/O vectors containing an excessive number of choices and/or having too many articulation points may also be flagged. Here, intractability is defined by the product of the alternate computer source code component space and the mean time required for computing each member of it. Practically, this must be based on the allowed execution time, which may be subject to interrupt. This follows because individual computer source code components and the execution path sequence can widely vary.

Randomization may be applied, during dream mode, to minimize the number of questions needed to select a computer source code component from the dynamic component library 130. Minimization of the questions for the retrieval of the headmost computer source code component in the dynamic component library 130 is favored in accordance with a 3-2-1 skew. Thus, it is desired that the most-recently used (MRU) computer source code components will be associated with the fewest questions, saving the user time. A selected row in the dynamic component library 130 may have one of its question-response pairings randomly deleted by the component-based synthesizer 120 or a dynamic library computer source code component manager that may be part of a computing device, such as that shown in FIG. 5. Then, the result may be checked to be sure that the question-answer pairing would not retrieve any other computer source code component (other than associated non-deterministic ones). If not, the question-answer pairing may be deleted as being superfluous to the retrieval of the intended computer source code component. Otherwise, the question-answer pairing may be restored; and, the selection process may be iterated. The greater the number of alternative answers to be selected among, the more highly weighted a question is for deletion. The 3-2-1 is described in further detail below with reference to FIG. 4.

Referring again to FIG. 1, a cybersecurity validator 150 (which may be part of the cyber-secure automatic programming system 100 or may exist separately) includes at least one compiler 160. The compiler 160 is configured to compile computer source code generated by the component-based synthesizer 120 to produce object code. The cybersecurity validator 150 also includes at least one object code processor 170 configured to execute the object code. For example, the compiler 160 compiles the first computer program source code and the second computer program source code generated by the component-based synthesizer 120 to produce first object code and second object code, respectively. The object code processor 170 then executes the first object code and the second object code to produce a first result and a second result, respectively.

The cybersecurity validator 150 further includes a comparison circuit 180 that is configured to compare results of execution of object code to determine whether a cyberattack has occurred or is in progress. For example, the comparison circuit 180 compares the first result and the second result and determines whether there is a difference between the first result and the second result. If there is a difference between the first result and the second result, the comparison circuit 180 determines that a cyberattack has occurred or is in progress. If the first result and the second result are the same, the comparison circuit 180 determines that a cyberattack has not occurred. As noted above, it is highly unlikely that a cyberattack will affect both the first computer source code and the second computer source code. However, using the cybersecurity validator 150 to detect a cyberattack through a comparison of results of compiled and executed computer source codes adds another layer of protection against cyberattacks.

It should be appreciated that a cyberattack may be detected at intermediate stages, before compilation and execution. For example, in the case of first and second computer source codes configured to produce a sort of numbers, a cyberattack may be detected by examining the first and second computer source codes generated by the component-based synthesizer 120 to determine what information is to be sorted, before a sort is executed. If both the first computer source code and the second computer source code indicate that numbers are to be sorted, then the assumption is that a cyberattack has not occurred at this stage. If, however, either the first computer source code or the second computer source code indicates that information other than numbers is to be sorted, then it may be determined that a cyberattack has occurred or is in progress. Detection of a cyberattack at intermediate stages may be performed by a processor that is part of or external to the computer source code synthesizer 125.

Computer source code components of the cyber-secure automatic programming system 100 may be included in one or more computing devices, such as the computing device 500 shown in FIG. 5 and described in more detail below.

Figure 3:
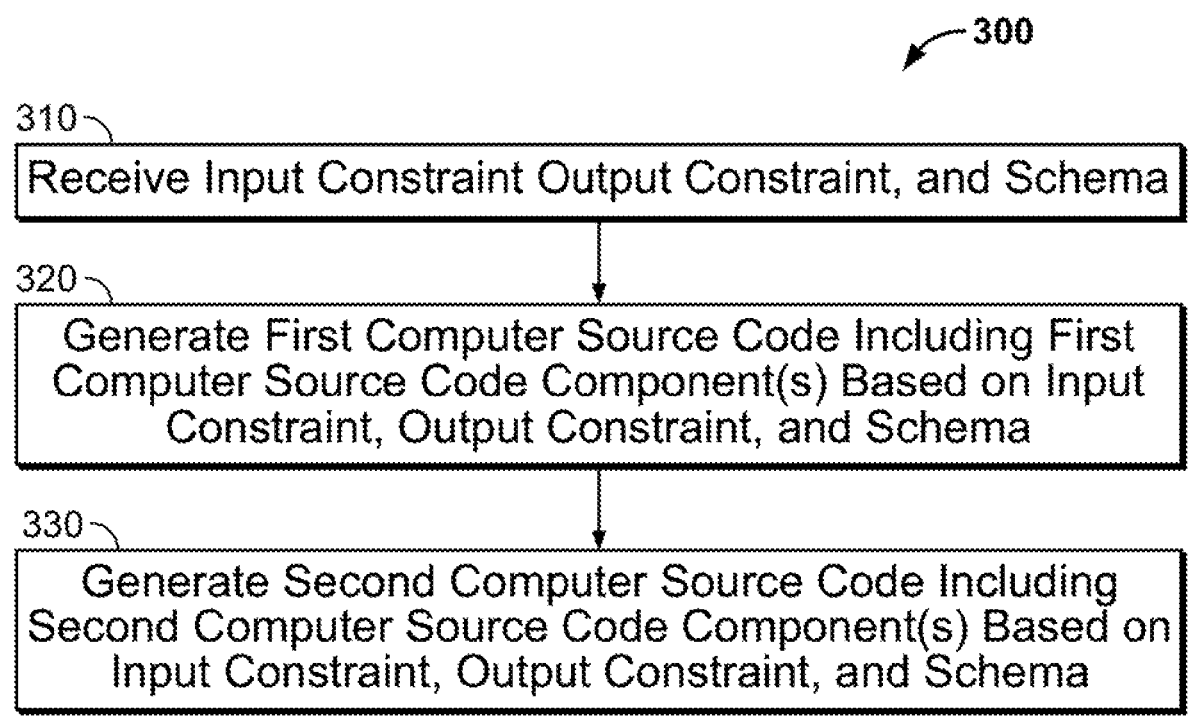
FIG. 3 illustrates a flow chart showing steps in a process for synthesizing semantically equivalent variants of computer source code to provide for protection against a cyberattack according to an illustrative embodiment.

FIG. 3 illustrates a flow chart showing steps in a process for synthesizing semantically equivalent variants of computer source codes to provide for protection against cyberattacks according to an illustrative embodiment. It should be appreciated that the steps and order of steps described and illustrated are provided as examples. Fewer, additional, or alternative steps may also be involved, and/or some steps may occur in a different order.

Referring to FIG. 3, the process 300 begins at step 310 at which a natural language statement specifying an input constraint, an output constraint, and a schema is received via, for example, the user interface 110 shown in FIG. 1. At step 320, first computer source code is generated by selecting at least one first computer source code component based on the input constraint, the output constraint, and the schema. The computer source code component may be selected from a dynamic component library 130 by a component-based synthesizer 120 as shown in FIG. 1.

At step 330, second computer source code is generated by selecting at least one second computer source code component based on the input constraint, the output constraint, and the schema. The second computer source code may also be selected from the dynamic component library 130 by the component-based synthesizer 120. The second source code is generated as a semantically equivalent variant of the first computer source code to provide for protection against a cyberattack.

Once the first computer source code and the second computer source code are compiled and executed to produce a first result and a second result, respectively, a cyberattack may be detected simply by comparing the first result and the second result. If there is a difference between the first result and the second result, this means that a cyberattack has occurred.

As noted above, during "dream mode", while the cyber-secure automatic programming system 100 is idle, a uniform skew or a 3-2-1-R skew may be used for randomizing or minimizing, in the Chaitin-Kolmogorov sense, questions asked of the user in the specification of a computer source code component.

Figure 4:
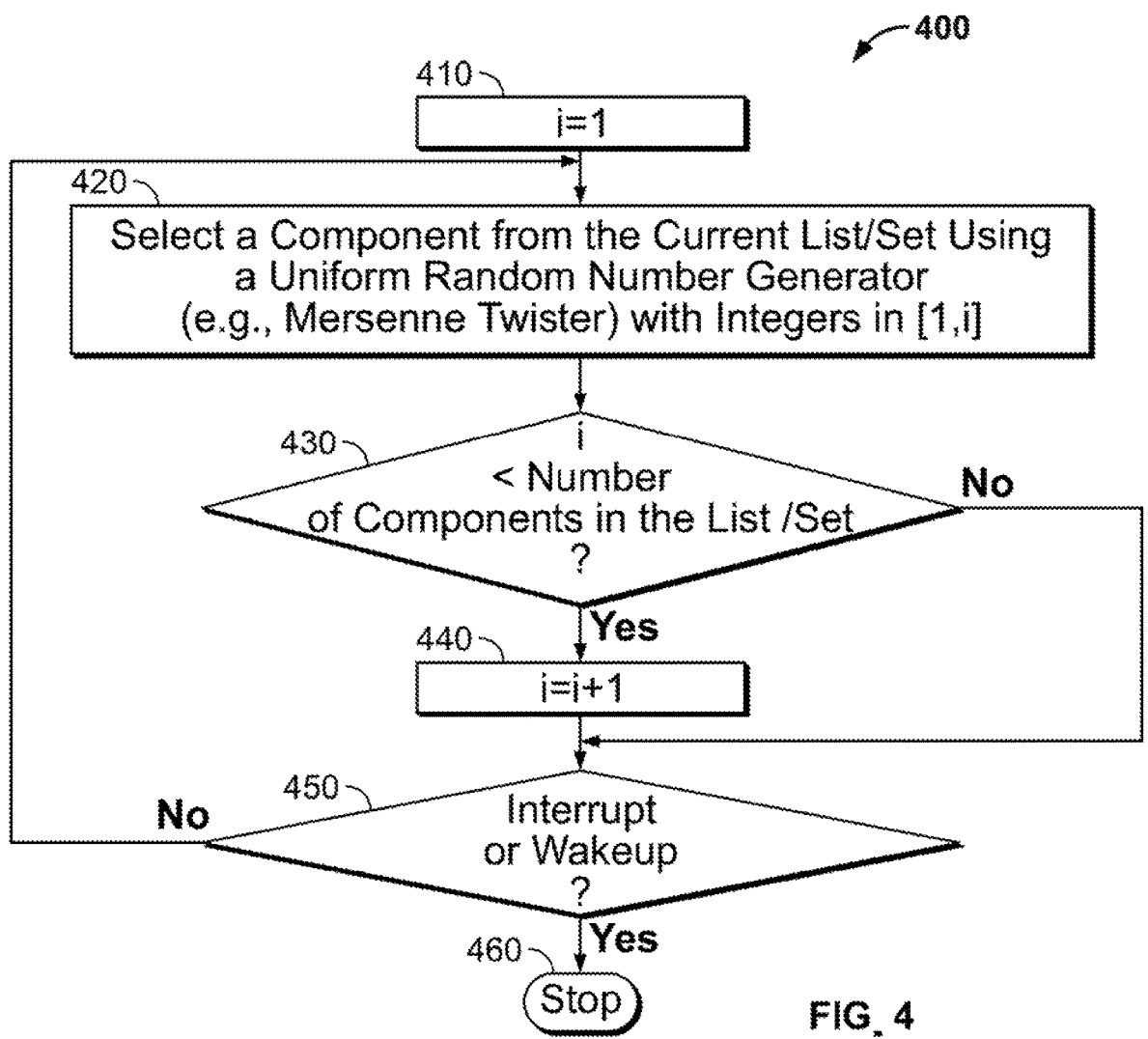
FIG. 4 illustrates a flow chart showing steps in a process for using a 3-2-1-R skew to minimize the number of questions asked of a user in specifying a computer source code component according to an illustrative embodiment.

An example of a process for using a 3-2-1-R skew to minimize the number of questions asked of a user in specifying a computer source code component is shown in FIG. 4. The steps depicted in FIG. 4 illustrate advancement in selection of an "$i^{th}$" computer source code component in a set of computer source code components.

As those skilled in the art will appreciate, the 3-2-1-R skew is a simple and fast technique for assigning computer source code components relative weights on the basis of Denning's principle of temporal locality, where "R" stands for a uniform random skew within the outer 3-2-1 skew. This type of skew is used to increase the likelihood of solving a problem by taking full advantage of the current operational domain profile.

The selection of a particular skew is domain specific. For example, the rate of radioactive decay is known to be proportional to how much radioactive material is left (excluding the presence of certain metals). The nuclear decay equation may be used as a skew for various radioactive materials and is given by $A(t)=A_0 e^{-\lambda t}$. Here, $A(t)$ is the quantity of radioactive material at time t, $A_0=A(0)$ is an initial quantity, and $\lambda$ (lambda) is a positive number (i.e., the decay constant) defining the rate of decay for the particular radioactive material. A countably infinite number of other skews may be applicable.

In the following assignment of skew-weights, the skew vector, S, favors the logical head of the computer source code component list/set in keeping with temporal locality. Computer source code components, which were most-recently acquired or fired, and thus appear at or nearer to the logical head of a computer source code component list/set, are proportionately more heavily weighted under the 3-2-1 skew. This differs from a uniform skew. The closer a computer source code component is to the top of its linked list, the greater its weight or importance.

The 3-2-1-R skew is a heuristic scheme for assigning skew weights with a dependency category including c computer source code components. Referring to FIG. 4, the 3-2-1-R skew process 400 starts at step 410 at which a computer source code component number "i" is set to 1. At step 420, computer source code components are selected from the set of computer source code components for weighting using a uniform random number generator, e.g., the Mersenne Twister. With "i" initially set to 1, a first computer source code component (a head computer source code component) in a set is initially selected to be weighted most heavily. That is, the head computer source code component in a set is assigned a weight of:

$$\frac{2c}{c(c+1)}$$

The computer source code component just below the head computer source code component is assigned a weight of:

$$\frac{2(c-1)}{c(c+1)}$$

The tail computer source code component in a set is assigned a weight of:

$$\frac{2}{c(c+1)}$$

The $i^{th}$ computer source code component from the head computer source code component thus has a weight of:

$$\frac{2(c-i+1)}{c(c+1)}$$

for i=1, 2, . . . , c, where, c specifies the number of computer source code components in the skew. Thus, for example, using a vector of four weights, the 3-2-1-R skew (S) is S=$(0.4, 0.3, 0.2, 0.1)^T$. There are a countably infinite number of possible skews, such that $\Sigma s_k$ 1.0.

At step 430, a determination is made whether there are any computer source code components that have not been assigned weights, i.e., whether i is less than the number c of computer source code components in the list/set. If there are computer source code components remaining in the set, the skew advances through computer source code components at step 440.

When all computer source code components have been considered for selection, the process repeats unless an interrupt or wakeup occurs at step 450. In the event of an interrupt or wakeup, the process stops at step 460.

The use of the 3-2-1-R skew is optional, and other schemes, such as uniform weighting, may be used instead. The 3-2-1-R skew is useful for domains where the value of the data deteriorates in linear proportion to its time of collection, i.e., where more recent data is valued more highly. The use of additional time-dependent weights, depending on whether there is an additional time dependency of the value of the knowledge, is also possible.

The process depicted in FIG. 4 may be performed by a computing device that is external to or included as part of the computer source code synthesizer 125 shown in FIG. 1. The computing device for performing the skew may be similar to that shown in FIG. 5 and described below.

Figure 5:
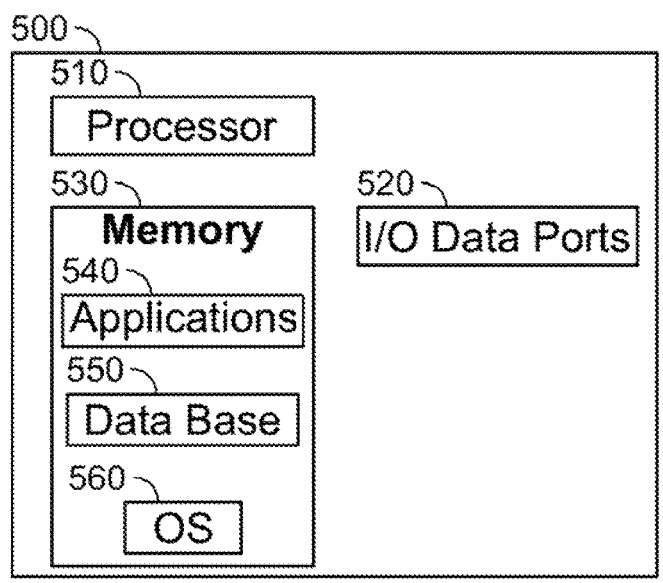
FIG. 5 illustrates a computing device that may be used in a cyber-secure automatic programming system according to an illustrative embodiment.

FIG. 5 is a block diagram of a computing device 500 with which various computer source code components of the cyber secure automatic programming system 100, e.g., computer source code components of the computer source code synthesizer 125 and/or computer source code components of the cybersecurity validator 150, may be implemented. The computing device 500 also represents a device for minimizing questions to be asked by weighting computer source code components according to 3-2-1-R skew or other skew according to illustrative embodiments. Although no connections are shown between the elements, illustrated in FIG. 5, those skilled in the art will appreciate that the elements can interact with each other via any suitable connections to carry out device functions.

The term "application", or variants thereof, is used expansively herein to include routines, program modules, program, computer source code components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like. The terminology "computer-readable media" and variants thereof, as used in the specification and claims, includes non-transitory storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed.

Referring to FIG. 5, the computing device 500 includes a processor 510 that receives inputs and transmits outputs via input/output (I/O) Data Ports 520. The I/O Data Ports 520 can be implemented with, e.g., any suitable interface through which data may be received and transmitted wired and/or wirelessly. For example, in the case of the computing device 500 used in the computer source code synthesizer 125 shown in FIG. 1, the inputs may include input constraints, output constraints, schemata, answers to questions, etc. Outputs may include, for example, questions for the user and generated computer source codes.

Although not shown, the computing device 500 may also include a physical hard drive. The processor 510 communicates with the memory 530 and the hard drive via, e.g., an address/data bus (not shown). The processor 510 can be any commercially available or custom microprocessor. The memory 530 is representative of the overall hierarchy of memory devices containing the software and data used to implement the functionality of the computing device 500. The memory 530 can include, but is not limited to, the types of memory devices described above. As shown in FIG. 5, the memory 530 may include several categories of software and data used in the computing device 500, including applications 540, a database 550, an operating system (OS) 560, etc.

The applications 540 can be stored in the memory 530 and/or in a firmware (not shown) as executable instructions and can be executed by the processor 510. The applications 540 include various programs that implement the various features of the computing device 500. For example, in the case of the cyber-secure automatic programming system 100 shown in FIG. 1, the applications 540 may include applications to implement the functions of the component-based synthesizer 120 and/or the cybersecurity validator 150.

The database 550 represents the static and dynamic data used by the applications 540, the OS 560, and other software programs that may reside in the memory. The database 550 may be used to store various data including data needed to execute the applications 540. For example, in the case of the computer source code synthesizer 125 shown in FIG. 1, the database 550 may store, e.g., computer source code components and their associated I/O test vectors and schema, questions-answer pairings, blackboard data, etc. Although one database 550 is shown, it should be appreciated that the database 550 represents one or more databases that correspond to the dynamic component library 130 and the blackboard database 140 shown in FIG. 1.

While the memory 530 is illustrated as residing proximate the processor 510, it should be understood that at least a portion of the memory 530 can be a remotely accessed storage system, for example, a server on a communication network, a remote hard disk drive, a removable storage medium, combinations thereof, and the like.

It should be understood that FIG. 5 and the description above are intended to provide a brief, general description of a suitable environment in which the various aspects of some embodiments of the present disclosure can be implemented. While the description includes a general context of computer-executable instructions, the present disclosure can also be implemented in combination with other program modules and/or as a combination of hardware and software in addition to, or instead of, computer readable instructions.

Further, although FIG. 5 shows an example of a computing device with computer source code components of the cyber-secure automatic programming system 100 may be implemented, those skilled in the art will appreciate that there may be other computer system configurations, including, for example, multiprocessors, parallel processors, virtual processors, distributed computing systems, microprocessors, mainframe computers, and the like.

According to the illustrative embodiments described above, semantic randomization of computer source code, i.e., the use of distinct semantically equivalent variants of computer source code, provides greater protection than syntactic diversity of object code, as cyberattacks can only affect, at most, one computer source code variant at a time. By contrast, cyberattacks are expected to be able to succeed against multiple versions of object code simultaneously. Semantic randomization thus offers greater cybersecurity when used alone, or in combination with syntactic randomization.

According to illustrative embodiments, symmetric knowledge is used in the generation of semantically equivalent variants of computer source code. Randomization is used to maximize the reuse of computer source code components by extracting out symmetric components. Symmetric components are used to minimize the time required and likelihood for detecting a cyberattack.

Randomization is achieved through maximal computer source code component reuse, minimizing development costs. Randomization serves to maximize reuse, which is one reason why complex algorithms are reduced to their defining computer source code components. Reusable functions and procedures, defining complex software and specified using natural language, are easier to write, read, and far easier to recode for semantic diversity and automatic programming in a component-based system. Reuse is also a good technique for exposing and thus minimizing the occurrence of program bugs.

Additionally, the embodiments described above seamlessly combine chance and formal reasoning in the specification of complex cyber-secure computer source code component software. Also, the use of I/O test vectors provides a symbiosis of software synthesis and testing It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A computing device, comprising: a user interface configured to receive, from a user, an input constraint, an output constraint, and a schema specified as a natural language statement; and
    a component-based synthesizer including at least one processor, wherein the component-based synthesizer is to process:
    present the user with a plurality of questions, via the user interface, for understanding the natural language statement, wherein the plurality of questions identifies the schema;
    generate first computer source including at least a first computer source code component based on the input constraint, the output constraint, and the schema;
    generate second computer source code including at least a second computer source code component based on the input constraint, the output constraint, and the schema,
    wherein the second computer source code is generated as a semantically equivalent variant of the first computer source code to provide for protection against a cyberattack;
    wherein the component-based synthesizer is further configured to select, as the second computer source code component, one computer source code component from among the selected set of computer source code components that satisfies the input constraint and the output constraint;
    wherein if there are multiple computer source code components among the selected set of computer source code components that satisfy the input constraint and the output constraint, the component-based synthesizer selects the one computer source code component from among the multiple computer source code components by chance.

2. The computing device of claim 1, further comprising a dynamic component library configured to:
    store sets of computer source components, wherein the schema is associated with a set of the computer source code components; and
    store the plurality of questions, wherein the dynamic component library applies randomization to the plurality of questions.

3. The computing device of claim 2, wherein the component-based synthesizer is configured to select the set of computer source code components that are associated with the schema.

4. The computing device of claim 3, wherein the component-based synthesizer is further configured to select, as the first computer source code component, one computer source code component from among the selected set of computer source code components that satisfies the input constraint and the output constraint.

5. The computing device of claim 4, wherein if there are multiple computer source code components among the selected set of computer source code components that satisfy the input constraint and the output constraint, the component-based synthesizer selects the one computer source code component from among the multiple computer source code components by chance.

6. A computer-based method, comprising:
    receiving, via a user interface, a natural language statement specifying an input constraint, an output constraint, and a schema presenting a plurality of questions, via the user interface, for understanding the natural language statement, wherein the plurality of questions identifies the schema;
    generating, by a component-based synthesizer, first computer source code by selecting at least one first computer source code component based on the input constraint, the output constraint, and the schema;
    generating, by the component-based synthesizer, second computer source code by selecting at least one second computer source code component based on the input constraint, the output constraint, and the schema,
    wherein the second computer source code is generated as a semantically equivalent variant of the first computer source code to provide for protection against a cyberattack;
    wherein selecting the second computer source code component comprises:
    selecting the set of computer source code components that is associated with the schema; and selecting, as the second computer source code component, one computer source code component from among the selected set of computer source code components that satisfies the input constraint and the output constraint;
    wherein if there are multiple computer source code components among the selected set of computer source code components that satisfy the input constraint and the output constraint, the one computer source code component is selected from among the multiple computer source code components by chance.

7. The computer-based method of claim 6, wherein the first computer source code component and the second computer source code component are selected from sets of computer source code components stored in a dynamic component library.

8. The computer-based method of claim 7, wherein the schema is associated with a set of the computer source code components stored in the dynamic component library, wherein the dynamic component library applies randomization to the plurality of questions.

9. The computer-based method of claim 8, wherein selecting the first computer source code component comprises:
   selecting the set of computer source code components that is associated with the schema; and
   selecting, as the first computer source code component, one computer source code component from among the selected set of computer source code components that satisfies the input constraint and the output constraint.

10. The computer-based method of claim 9, wherein if there are multiple computer source code components among the selected set of computer source code components that satisfy the input constraint and the output constraint, the one computer source code component is selected from among the multiple computer source code components by chance.

11. A computer-based system, comprising:
    a user interface configured to receive a natural language statement specifying an input constraint, an output constraint, and a schema;
    a dynamic component library configured to: store sets of computer source code components;
    store a plurality of questions, wherein the dynamic component library applies randomization to the plurality of questions;
    a component-based synthesizer to process:
    present a plurality of questions, via the user interface, for understanding the natural language statement, wherein the plurality of questions identifies the schema;
    generate first computer source code by selecting a first sequence of computer source code components based on the input constraint, the output constraint, and the schema; and
    generate second computer source code by selecting a second sequence of computer source code components based on the input constraint, the output constraint, and the schema, wherein the second computer source code is generated as a semantically equivalent variant of the first computer source code to provide for protection against a cyberattack;
    wherein selecting the second sequence of computer source code components comprises:
    selecting the set of computer source code components that is associated with the schema; and
    wherein if there are multiple sequences of computer source code components among the selected set of computer source code components that satisfy the input constraint and the output constraint, the one sequence of computer source code components is selected from among the multiple sequences of computer source code components by chance.

12. The computer-based system of claim 11, wherein the schema is associated with a set of the computer source code components stored in the dynamic component library.

13. The computer-based system of claim 12, wherein selecting the first sequence of computer source code components comprises:
    selecting the set of computer source code components that is associated with the schema; and
    selecting, as the first sequence of computer source code components, one sequence of computer source code components from among the selected set of computer source code components that satisfies the input constraint and the output constraint.

14. The computer-based system of claim 13, wherein if there are multiple sequences of computer source code components among the selected set of computer source code components that satisfy the input constraint and the output constraint, the one sequence of computer source code components is selected from among the multiple sequences of computer source code components by chance.

* * * * *